(12) United States Patent
Bianchini et al.

(10) Patent No.: US 12,462,594 B2
(45) Date of Patent: Nov. 4, 2025

(54) REPORT TEMPLATE GENERATION BASED ON USER INTENT

(71) Applicant: ADP, Inc., Roseland, NJ (US)

(72) Inventors: Leandro da Silva Bianchini, Parsippany, NJ (US); Allan Barcelos, Porto Alegre (BR); Fernanda Tosca, Porto Alegre (BR); Rodrigo Faria, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 392 days.

(21) Appl. No.: 18/080,183

(22) Filed: Dec. 13, 2022

(65) Prior Publication Data

US 2024/0193977 A1 Jun. 13, 2024

(51) Int. Cl.
*G06V 30/262* (2022.01)
*G06F 40/20* (2020.01)
*G06V 30/19* (2022.01)
*G06V 30/413* (2022.01)
*G06V 30/414* (2022.01)

(52) U.S. Cl.
CPC .......... *G06V 30/274* (2022.01); *G06F 40/20* (2020.01); *G06V 30/19093* (2022.01); *G06V 30/19107* (2022.01); *G06V 30/413* (2022.01); *G06V 30/414* (2022.01)

(58) Field of Classification Search
CPC .............. G06V 30/274; G06V 30/413; G06V 30/19107; G06V 30/19093; G06V 30/414; G06F 40/20
See application file for complete search history.

(56) References Cited

U.S. PATENT DOCUMENTS

| | | | |
|---|---|---|---|
| 8,626,769 B1 * | 1/2014 | Bhatt | G06Q 40/12 707/740 |
| 9,087,354 B1 * | 7/2015 | Hambir | G06Q 20/042 |
| 9,153,031 B2 * | 10/2015 | El-Saban | G06T 7/194 |
| 10,984,484 B1 * | 4/2021 | Nidecker | G06Q 10/063114 |
| 11,880,648 B2 * | 1/2024 | Garimella | G06N 3/045 |
| 11,900,046 B2 * | 2/2024 | Stenerson | G06F 9/451 |

* cited by examiner

*Primary Examiner* — Bhavesh M Mehta
*Assistant Examiner* — Eunice Lee
(74) *Attorney, Agent, or Firm* — Foley & Lardner LLP

(57) ABSTRACT

The present disclosure relates generally to tools to determine a user's intent and, more particularly, to a system, method and computer program product to generate a report template based on user's intent. The method includes: extracting, by a computer system, text and user selected features from one or more reports built in a reporting application; classifying, by the computer system, keywords in the text and the select features; identifying, by the computer system, common keywords and associated selected features within the one or more reports; determining, by the computer system, an intent of the user based on the common keywords and associated selected features; and generating, by the computer system, a report template with prepopulated features of the selected features based on the intent of the user.

15 Claims, 7 Drawing Sheets

FIG. 3B

REPORT TEMPLATE GENERATION BASED ON USER INTENT

TECHNICAL FIELD

The present disclosure relates generally to tools to determine a user's intent and, more particularly, to a system, method and computer program product to generate a report template based on user's intent.

BACKGROUND

Reporting applications are used by clients and users to create reports. These reports may be any number of different types of reports such as reports related to human resources, benefits, payroll, deductions, etc.

To create reports through the reporting application, the user must select countless different fields, text, filters, etc. to create a desired report. However, with so many different fields, etc., it may become cumbersome and complex for the user to create specific reports anew each time they desire certain information. In other words, a wide set of fields, etc., sometimes makes the user struggle with the reporting application and could lead to frustration about which fields, filters, derived or calculated fields, etc., they should select in order to obtain the desired report.

Currently, reporting applications are only smart enough to recognize if the user selected a set of fields that are feasible or not, and log each step taken by the users. The logging of such information, however, does not meaningfully assist in a current user or future user in creating similar reports.

SUMMARY

In a first aspect of the present disclosure, a method includes: extracting, by a computer system, text and user selected features from one or more reports built in a reporting application; classifying, by the computer system, keywords in the text and the select features; identifying, by the computer system, common keywords with associated selected features within the one or more reports; determining, by the computer system, an intent of the user based on the common keywords and associated selected features; and generating, by the computer system, a report template with prepopulated features of the selected features based on the intent of the user.

In another aspect of the present disclosure, there is a computer program product. The computer program product includes one or more computer readable storage media having program instructions collectively stored on the one or more computer readable storage media. The program instructions are executable to: extract words of report titles as provided by a user when creating a report in a reporting application; extract features selected by the user when creating the report in a reporting application; classify the extracted words and selected features; group together the classified words and the features and form them into respective clusters that exhibit commonality; identify common features with common keywords; determine an intent of the user based on the common keywords and common features; and create a report template based on the intent of the user.

In a further aspect of the present disclosure, there is a computer system which includes a processor, a computer readable memory, one or more computer readable storage media, and program instructions collectively stored on the one or more computer readable storage media. The program instructions are executable to: extract text and user selected fields from a plurality of reports built in a reporting application; identify common keywords with associated selected fields; determine an intent of the plurality of reports based on the common keywords and associated selected fields; and generate a report template with prepopulated features of the selected features based on the intent of the user.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIGS. 3A-3B show user interfaces and underlying functionality in accordance with aspects of the present disclosure.

DETAILED DESCRIPTION OF ASPECTS OF THE INVENTION

Figure 1:
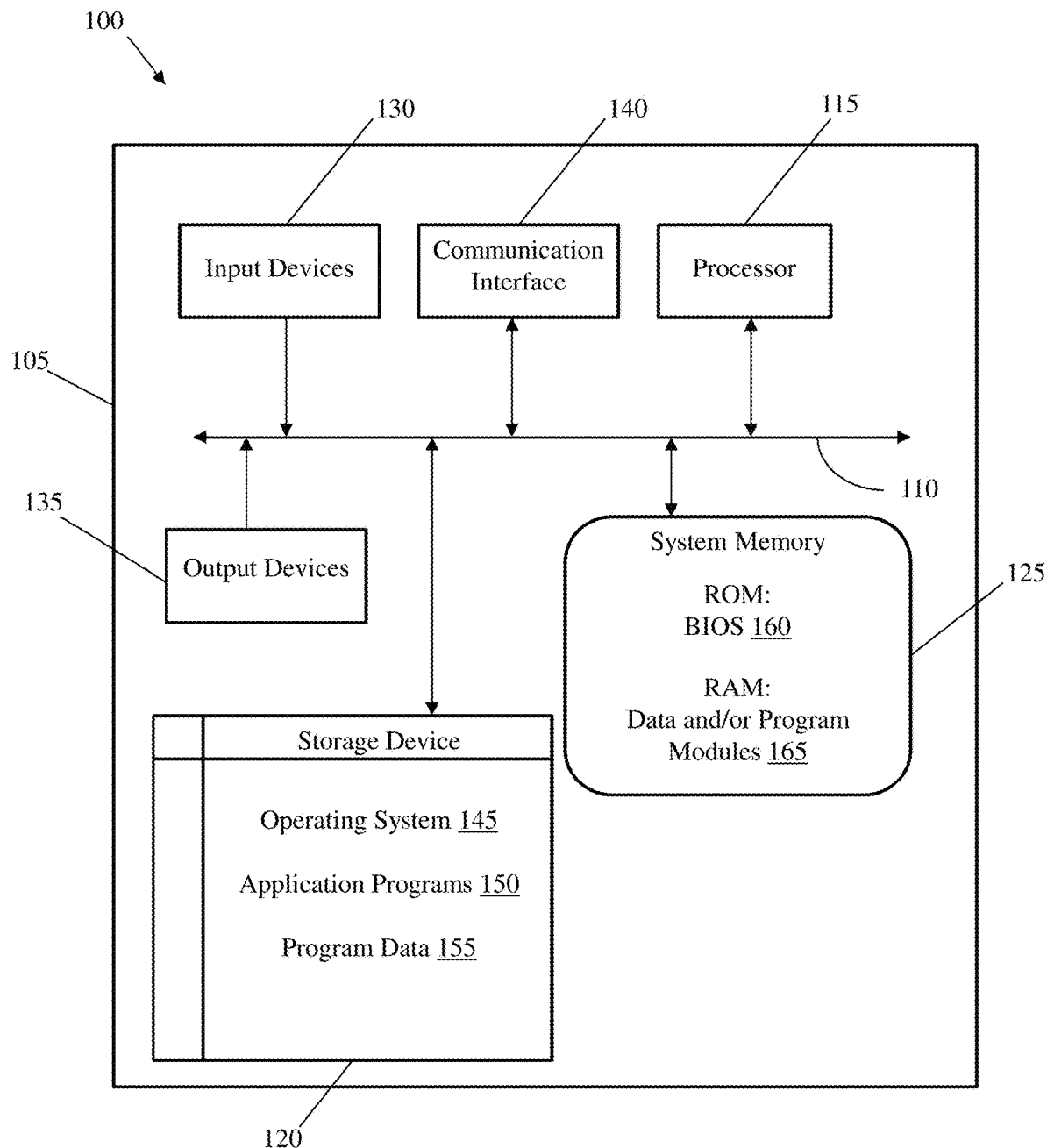
FIG. 1 is an illustrative architecture of a computing system implemented in embodiments of the present disclosure.

The present disclosure relates generally to tools to determine a user's intent and, more particularly, to a system, method and computer program product to generate a report template based on a user's intent (e.g., intent of the report). In more specific embodiments, the system, method and computer program product (hereinafter also referred to as "tool(s)") may determine the intent of a user based on reports that they have generated and, using this intent, create report templates for future users to use when generating additional reports. In this way, report templates can automatically be generated, which provides the user the ability to easily generate specific reports using relevant prepopulated fields and categories from different domains without the need to determine or struggle with a finding which different fields, texts, filters, etc. in the reporting application are relevant for report generation.

In more specific embodiments, the system, method and computer program product provide a technical feature to a technical problem of report generation. For example, the tools provided herein recognize a report context or objective (e.g., intent of the user report), and with advances in machine learning, neural networking, search, recommending, and semantic disambiguation promoted by artificial applications, etc., allow a broad set of new features and capabilities including determining the intent of a user. The intent (of the report), in turn, can be used to create report templates, which are prepopulated templates used to generate or build other reports. In this way, the intent of the users can be used to improve reporting features including, e.g., help a design team to design more focused interfaces and improve the user experience by minimizing the need for a user to understand and select fields, filters, amongst countless such features, when creating their report. This will also minimize user frustration, while improving the reporting experience.

By way of an example use, the tools provided herein may aggregate and digest data from disparate systems (e.g., domains) associated with any number of different types of reports. These disparate systems may be systems associated with human resources, payroll, benefits, deductions, etc. The reports can be countless different reports ranging from payroll reports, 401k loan reports, employee data reports, benefits reports, etc., each comprising different fields, similar fields or combinations thereof. The reports may include different fields and categories associated with different types of information.

The tools perform analysis on the data in the reports including finding keywords in text, and associating the keywords with certain selected fields, filters, etc., using machine learning and/or neural network computing to ascertain an intent of the user. The intent (of the report) is then used to construct report templates with prepopulated fields, filters, etc., based on an objective of the user who wants to create a new report. The report templates can be used by the user to create their own reports, simply by selecting a report template that would meet their objective and intent. In creating their own reports, the user can manipulate the report templates by adding or removing selected fields and/or filtering of the fields; instead of starting with a blank report generation tool (e.g., having to scroll through hundreds of fields which is prone to error, complexity and leads to user frustration). This will provide the user with the capability to significantly streamline the report building process based on what users have done in the past. Also, implementing the report templates will significantly reduce call support services and associated costs as the report templates will significantly assist the user in report generation.

Implementations of the present disclosure may be a computer system, a computer-implemented method, and/or a computer program product. The computer program product is not a transitory signal per se, and may include a computer readable storage medium (or media) having computer readable program instructions thereon for causing a processor to carry out aspects of the present disclosure. As described herein, the computer readable storage medium (or media) is a tangible storage medium (or media). It should also be understood by those of skill in the art that the terms media and medium are used interchangeable for both a plural and singular instance.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
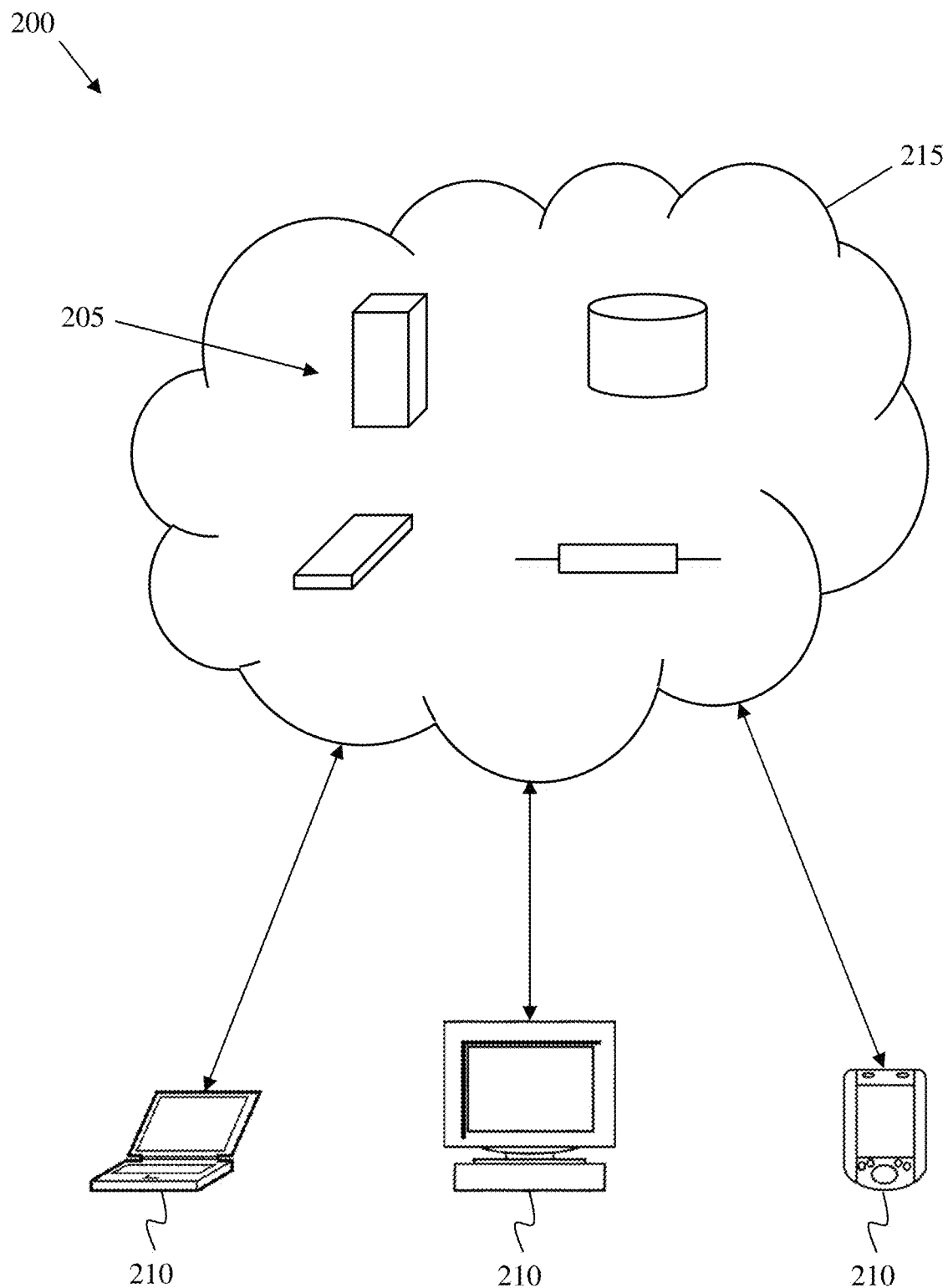
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 115 enables the computing device 105 to:

(i) Extract (and learn) words of report titles and other text, as provided by a user when creating a report;

(ii) Extract (and learn) features selected by the user in the report(s). These features may be text, fields and combinations thereof selected by user;

(iii) Classify the extracted words and selected features, including identifying keywords and selected features amongst similar type of reports;

(iv) Group together the classified words (e.g., keywords) and the features, and form them into respective clusters or categories that exhibit commonality (e.g., clusters);

(v) Identify common features with common keywords;

(vi) Determine the intent of the user (e.g., intent of the report generated by the user) based on the common keywords and common features; and (vii) Create a report template based on the common features and words, which is now based on the intent of the user.

In embodiments, the fields can come from drop down menus or searches selected by the user through a search function, etc. or a report application The fields can be any data associated with an employee, employer, etc., including, e.g., birthdate, employment location, job description, employment dates, benefits, salary, taxes, etc., obtained from any domain such as human resources, benefits, payroll, deductions, etc. The features may also include specific selected filters. The text, on the other hand, may be text inserted by the user.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to generate report templates and store these report templates into the storage device 120. Accordingly, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3A:
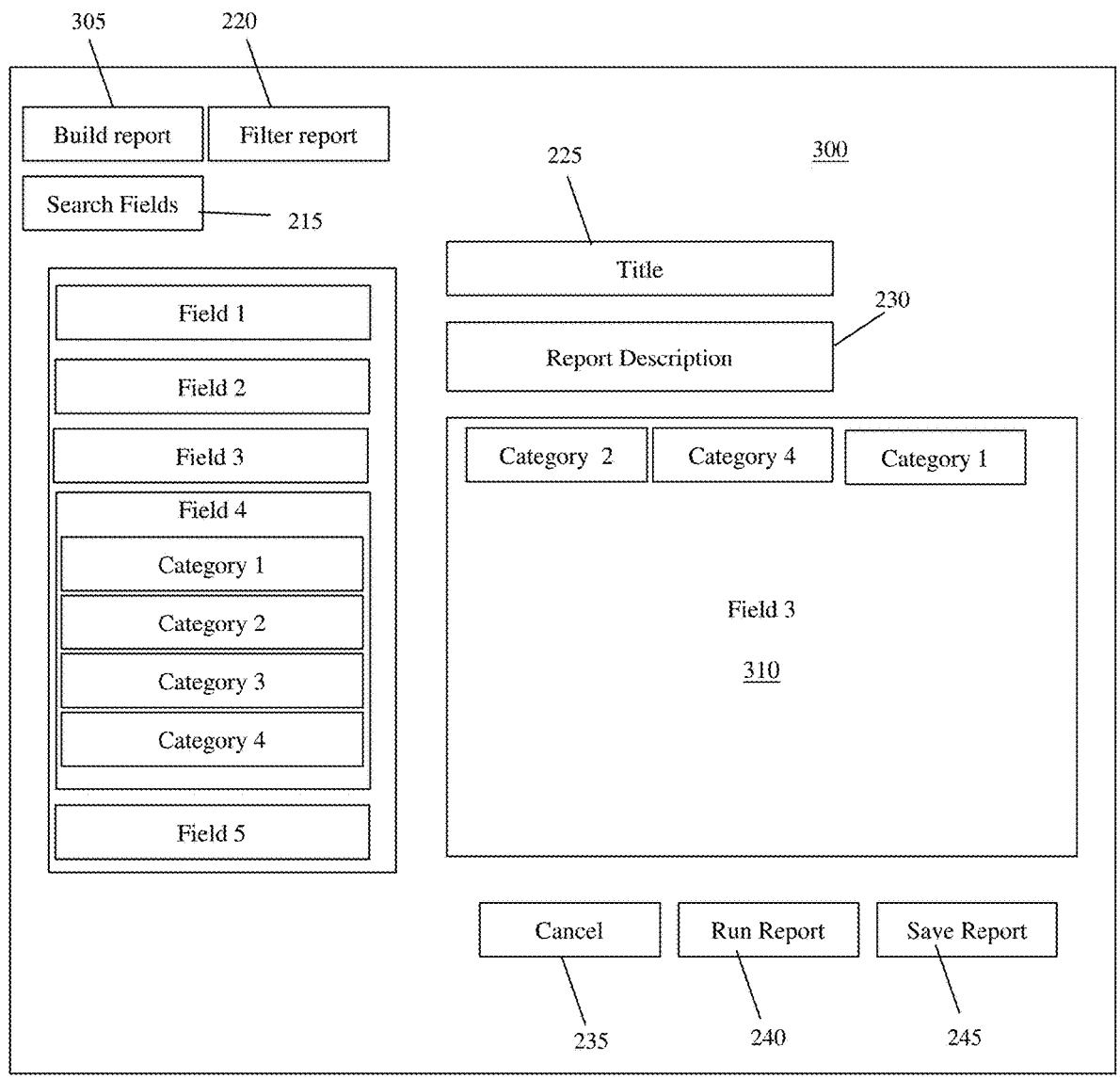
Figure 3B:
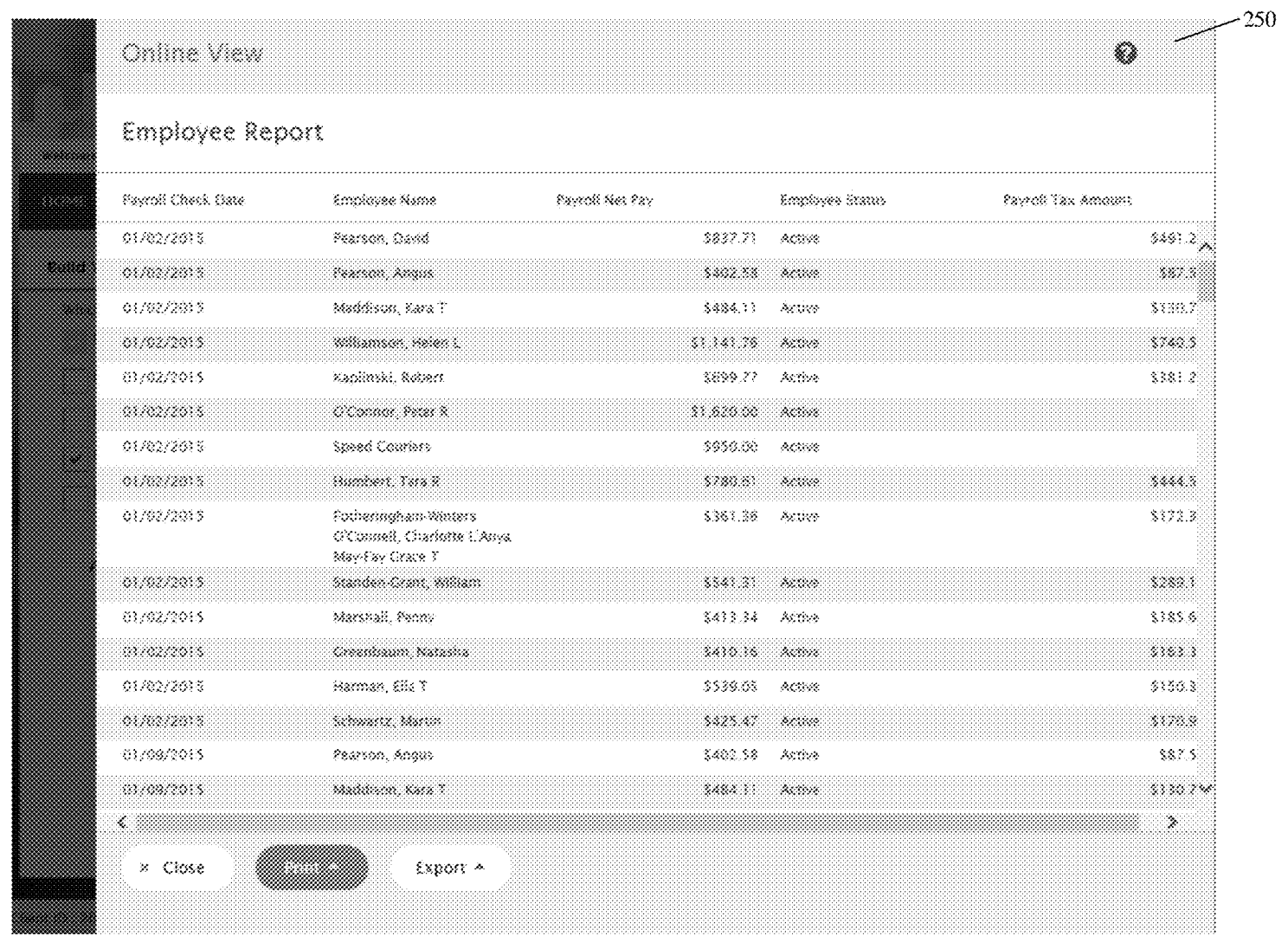

FIGS. 3A-3B show user interfaces and underlying functionality in accordance with aspects of the present disclosure. The user interfaces can be provided using one or more program modules such as program modules 165 described with respect to FIG. 1. In embodiments, separate modules may be integrated into a single module. Additionally, or alternatively, a single module may be implemented as multiple modules. In practice, the environment may include additional devices and/or networks; fewer devices and/or networks; different devices and/or networks; or differently arranged devices and/or networks than illustrated in FIG. 1.

FIG. 3A shows an exemplary user interface used in a reporting application and which may be the basis used to create or generate a report as shown in, e.g., FIG. 3B. It should be under by those of ordinary skill in the art that the exemplary user interface shown in FIG. 3A is merely a non-limiting, illustrative example of a user interface of a reporting application. Accordingly, the present description is applicable different interfaces used with different types of reporting applications, e.g., ADP reporting applications.

More specifically, the interface 300 includes a build report function 305 which, upon selection, provides a user with a plurality of different fields, e.g., Field 1, Field 2, Field 3, Field 4, Field 5, etc. The user may scroll through hundreds of fields, each of which may be representative of drop down menus related to different types of data from different data sources or domains. For example, the different data sources may be a payroll system, human resources system, benefits system, etc. Similarly, the different fields or data may be, e.g., payroll, start date of employment, 410k contributions, benefits, display name, birthdates, etc. In embodiments, for example, the user may also search for specific fields using search field 215.

The user may select any of the fields in order to populate window 310 with specific categories associated with the fields. The selected field, e.g., Field 4, may include additional categories associated with the selected field, e.g., Category 1, Category 2, Category 3, Category 4, etc. It should be understood that the user may select many different fields and many different categories to populate window 310. By way of example, the user may select a field associated with payroll details and the different categories may be, e.g., payroll check date, payroll net pay, payroll check number, period start and end data, payroll frequency, special payment type, special payment check date, etc. It should be understood by those of skill in the art that there are numerous different fields and numerous different categories for each field, and that the categories and fields described herein are merely one example of countless reports that can be generated by the user.

Still referring to FIG. 3A, the user can filter the reports by selecting filter report functionality 220. The filter allows the user to further filter results provided within the window 310. For example, the user may select to filter out or include different categories, etc. within the window 310. The user also has the capability of adding different filter conditions such as, e.g., employee name, payroll taxes, employee status, etc., depending on the specific selected categories and need of the user. The filters may run every time the user runs the report, or may be applied manually by the user.

The user can provide a title to the report in box 225. Additionally, the user can provide a report description in box 230. Upon completion of the selection of the fields, insertion of text, and application of filters, etc., the user has the option to cancel the report by selecting icon 235, run the report by selecting icon 240 or saving the report by selectin icon 245. Running the report may include the options of printing, exporting into a particular format, e.g., PDF, xls, etc., or viewing online. FIG. 3B shows an example report in user interface 250.

Figure 4:
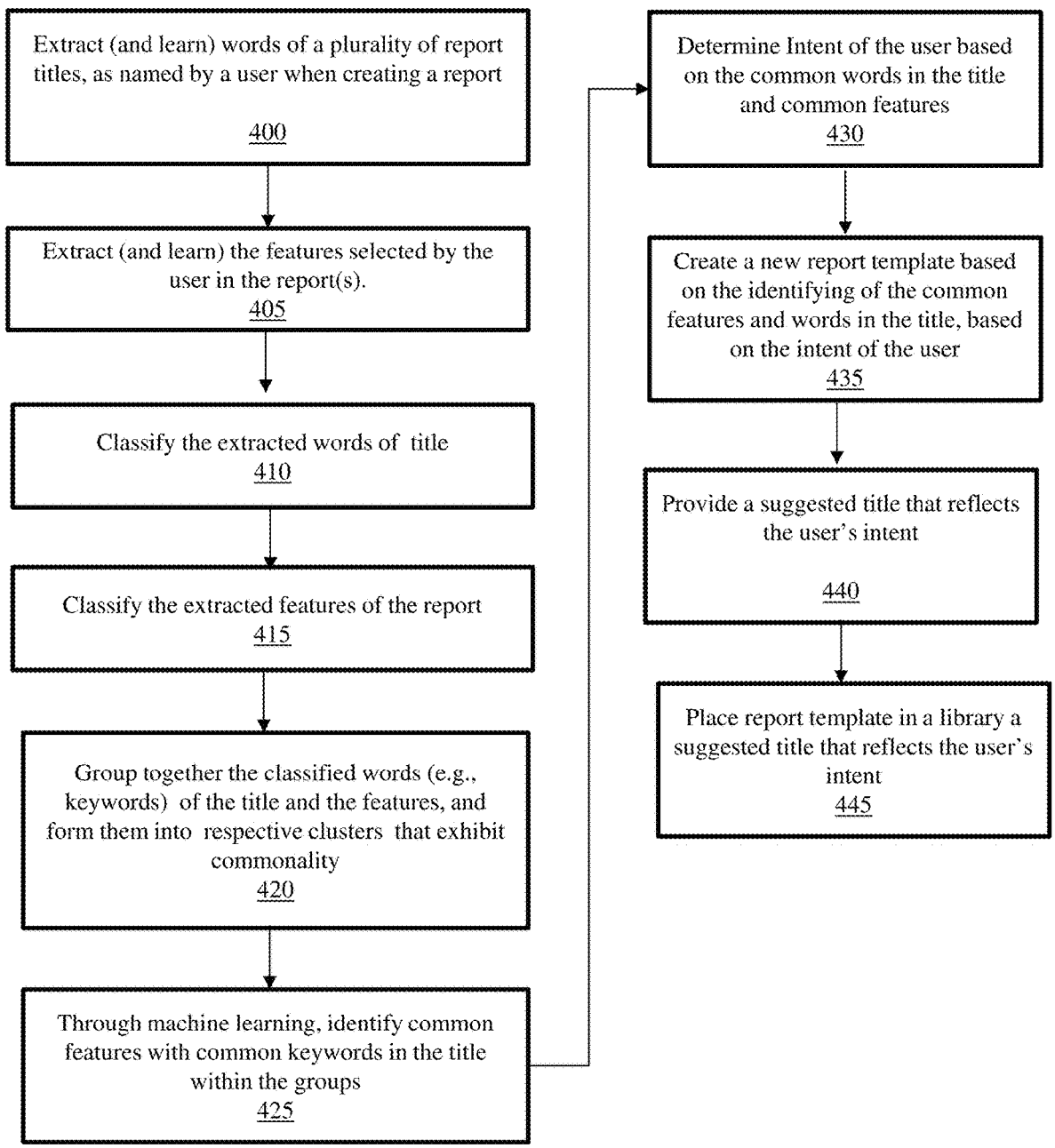
FIG. 4 depicts an exemplary flow for a process in accordance with aspects of the present disclosure.

As described in more detail with respect to FIG. 4, the tools provided herein identify intents of the user in order to generate a report template. This is accomplished by using machine learning and natural language processing to automatically associate text and fields from the user generated report, e.g., as shown in FIGS. 3A and 3B. For example, the tools provided herein can use intent classification to automate categorization of text data based on customer (e.g., user) goals or objective. In an example, the intent classifier automatically analyzes texts and fields of the reports generated by the user and categorizes them into intents such as different types of reports for payroll, human resources, etc. The analyzed text may be the title and description provided by the user, as an example, in which common keywords may be clustered or grouped together, which are then associated and grouped together with common fields and/or filters on the fields.

More specifically, the intent classification uses machine learning and natural language processing to automatically associate keywords of the report, e.g., title of the report and a description of the report, and the fields and filters selected by the user with a particular intent of the report. Illustratively, the machine learning model learns keywords such as "payroll report" over several reports has an intent to determine liabilities associated with payroll, e.g., taxes that need be paid to different governmental entities. The intent classifiers can be trained with text examples of the actual generated user reports, e.g., training data. The more examples provided to the model, the more accurate becomes the intent classifier as it constantly learns from associating the text with the fields and filters to determine the intent of the user. In embodiments, the text can be extracted by text extraction to identify specific data (keywords) from the text, such as locations, dates, company names, etc., that are related a certain field in the report, which is then used to determine a user's intent.

More specifically, FIG. 4 depicts an exemplary flow for a process in accordance with aspects of the present disclosure. The exemplary flow can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 4 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

At step 400, the processes extract words (e.g., text) of a plurality of report titles. At this step, the processes can also extract the words of the description of the report. In embodiments, as an example, the machine learning will learn the extracted words. In this way, data sets can be imported or uploaded for training in an intent classifier. In embodiments, the data can be in different file formats including, e.g., CSV files.

At step 405, the processes extract and learn the features selected by the user within the reports. Again, in this way, data sets can be imported or uploaded for training in the intent classifier. In embodiments, the data can be in different file formats including, e.g., CSV files.

In embodiments, the features may include any combination of fields and filters of built reports. The fields can include any type of report information as described herein, e.g., birthdate, employment location, job description, employment dates, 401k information, etc. Also, the fields can come from any domain such as human resources, benefits, payroll, etc. The features may also include specific selected filters used on the text or fields.

As step 410, the processes classify the extracted words of a title of the report and, in embodiments, the report description provided the user. At step 415, the processes classify the extracted features of the report. For example, in embodiments, after successfully importing the data, it is possible to create tags for the intent classifier to train a model. It should be recognized that the more tags added, the more training samples will be needed to train the model. As the data is tagged, the model will learn from the examples and criteria, and its prediction level will increase.

At step 420, the processes group together the classified words (e.g., keywords known to be used in similar reports) and the common features used with the classified words, and form them into respective clusters that exhibit commonality. At step 425, the processes, e.g., through machine learning, identify common features with common keywords in the words within the groups. At step 430, the processes determine an intent of the user based on the common keywords in the title and common features. At step 435, the processes create a new report template based on the identified common features and keywords, which is effectively based on the intent of the user. For example, the processes can use certain fields and filters that were found to be in reports that have a common keyword in the title and/or description of the report, and use the associated fields and filters in a report template. As noted herein, the report template will have prepopulated fields associated with an intent or objective of the user At step 440, the processes provide a suggested title that reflects the user's intent (which can be changed by the user). This suggested title may use a common keyword found in titles of reports which had the common fields, etc. At step 445, the processes place the report template in a library with the suggested title that reflects the user's intent for later usage.

Figure 5:
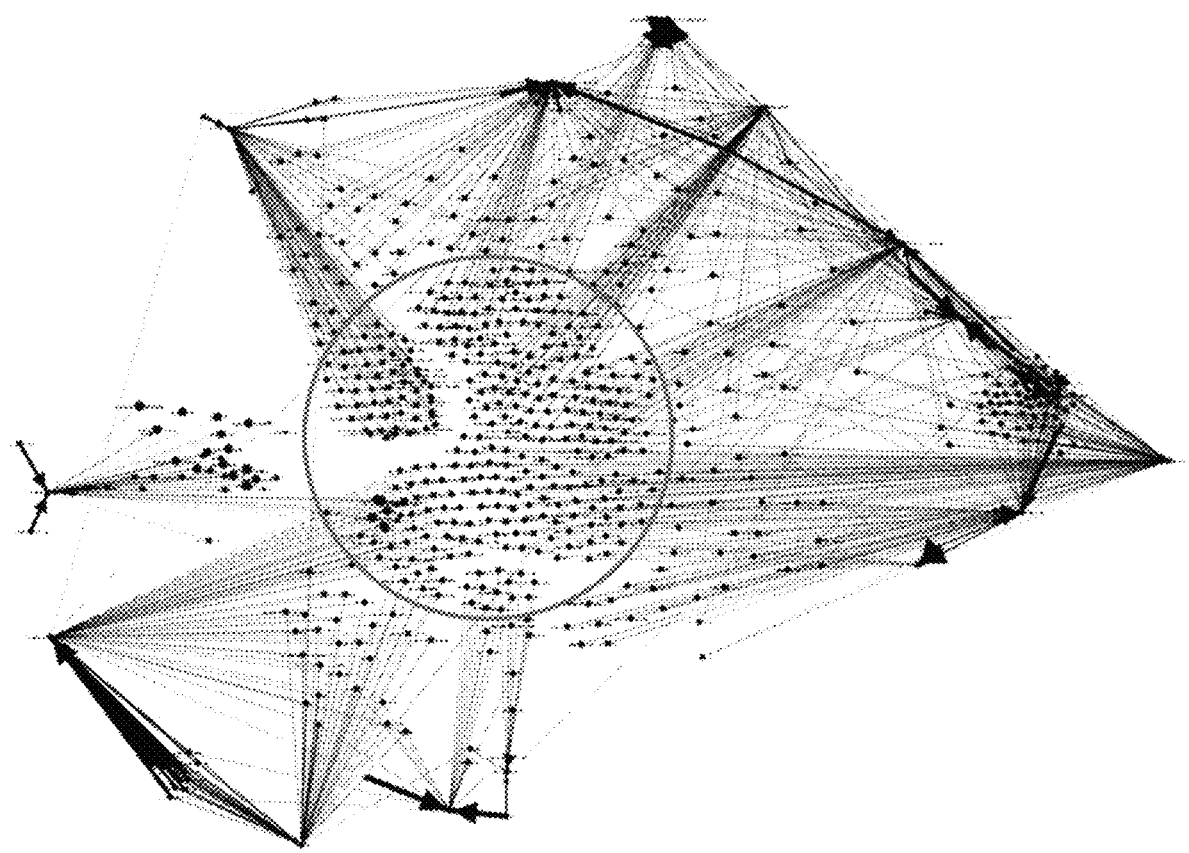
FIG. 5 is an exemplary graph showing clusters and relationships for building a report template in accordance with aspects of the present disclosure.

In embodiments, a Kernighan-Lin algorithm can be implemented to provide the classifications as noted herein. As should be recognized a Kernighan-Lin algorithm is a heuristic algorithm for finding partitions of graphs such as shown in FIG. 5. An example, includes:

```
function Kernighan-Lin(G(V,E)):
    determine a balanced initial partition of the nodes into sets A and
B
        do
        compute D values for all a in A and b in B
        let gv, av, and bv be empty lists
        for (n := 1 to |V|/2)
            find a from A and b from B, such that g = D[a] + D[b] −
2*c(a, b) is maximal
            remove a and b from further consideration in this pass
            add g to gv, a to av, and b to bv
            update D values for the elements of A = A \ a and B = B \ b
        end for
        find k which maximizes g_max, the sum of gv[1],...,gv[k]
        if (g_max > 0) then
            Exchange av[1],av[2],...,av[k] with bv[1],bv[2],...,bv[k]
        until (g_max <= 0)
    return G(V,E)
```

Figure 6:
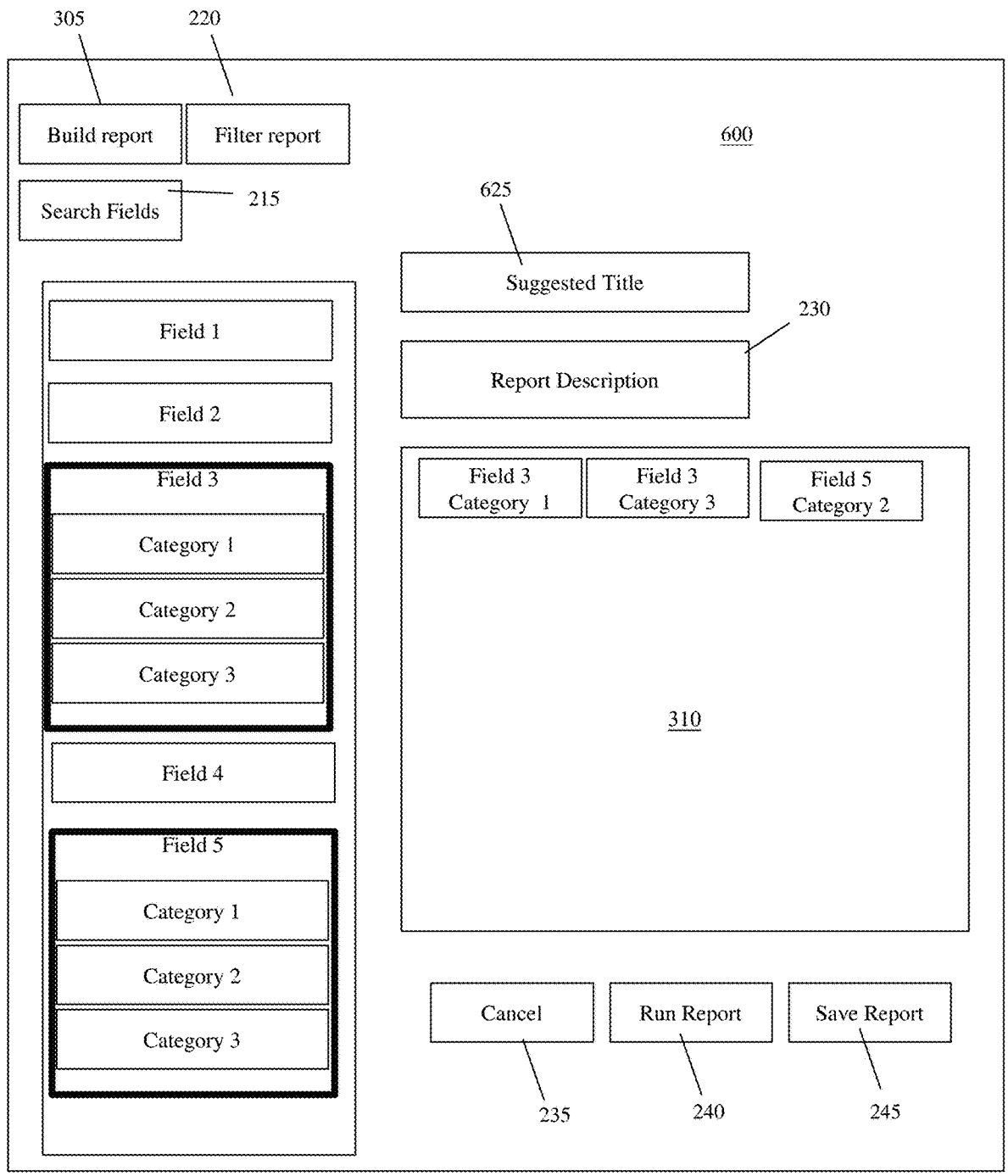
FIG. 6 represents an exemplary report template in accordance with aspects of the present disclosure.

FIG. 6 represents an exemplary report template in accordance with aspects of the present disclosure. More specifically, in FIG. 3, a report template 600 is provided with a suggested title 625. This report title may be changed by the user. The user may also enter a report description 230. In this example, based on previous reports and an understanding of an intent of the users of different reports, the report template can be prepopulated, in window 310, with different fields, e.g., Field 1 and Field 5, and associated categories, e.g., e.g., Category 1, Category 3, Category 2, from the fields. This report template is now a starting place for the user to further add or delete fields and categories, and/or filter certain information, based on their initial intent to create or generate their own report. In this way less effort is now required to create reports, as prepopulated fields and categories are automatically provided based on user intent. These prepopulated fields and categories would accurately reflect the users' objectives and goals, and eliminate the need to scroll through hundreds of fields, etc.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:
receiving, by a computer system from a plurality of disparate computing systems, a plurality of output data objects generated by one or more applications executed on the plurality of disparate computing systems, the plurality of output data objects including a plurality of fields;
providing, by the computer system, for display via an interface, a drop down menu containing the plurality of fields;
receiving, by the computer system, a first input from a user selecting a first field of the plurality of fields displayed via the interface;
extracting, by the computer system, text from a set of output data objects of the plurality of output data objects, the set of output data objects including the first field;
identifying, by the computer system, keywords in the text and the first field that are common to similar output data objects of the set of output data objects, wherein the similar output data objects share one or more fields;
grouping, by the computer system, the keywords that are shared across the similar output data objects of the set of output data objects into one or more clusters;
determining, by the computer system, an intent of the user based on the keywords of the one or more clusters and the first field;
generating, by the computer system, a suggested title based on the keywords of the one or more clusters;
generating, by the computer system, a template based on the intent, the template including the suggested title and the first field;
transmitting, by the computer system, for display via the interface, the template; and transmitting, by the computer system, for display via the interface, in response to receiving a second input from the user selecting the template, an output data object generated using the template, the output data object including the suggested title and the first field.

2. The method of claim 1, wherein the text includes a description of the plurality of output data objects.

3. The method of claim 1, wherein the plurality of fields include underlying data from different domains.

4. The method of claim 1, wherein the intent is determined by an intent classifier.

5. The method of claim 4, wherein the intent classifier comprises machine learning and natural language processing to automatically group the keywords shared across the similar output data objects.

6. The method of claim 1, wherein the suggested title and the first field can be manipulated by a user.

7. The method of claim 1, further comprising the template in a library which can be retrieved by users.

8. A computer program product comprising one or more computer readable storage media having program instructions collectively stored on the one or more computer readable storage media, the program instructions executable to:
receive, from a plurality of disparate computing systems, a plurality of output data objects generated by one or more applications executed on the plurality of disparate computing systems, the plurality of output data objects including a plurality of fields;
provide, for display via an interface, a drop down menu containing the plurality of fields;
receive a first input from a user selecting a first field of the plurality of fields displayed via the interface;
extract text from a set of output data objects of the plurality of output data objects, the set of output data objects including the first field;
identify keywords in the text and the first field that are common to similar output data objects of the set of output data objects, wherein the similar output data objects share one or more fields;
group together the keywords that are shared across the similar output data objects of the set of output data objects into one or more clusters;
determine an intent of the user based on the keywords of the one or more clusters and the first field;
generate a suggested title based on the keywords of the one or more clusters;
create a template based on the intent of the user, the template including the suggested title and the first field;
transmit, for display via the interface, the template; and
transmit, for display via the interface, in response to receiving a second input from the user selecting the template, an output data object generated using the template, the output data object including the suggested title and the first field.

9. The computer program product of claim 8, wherein grouping the keywords comprises applying a heuristic algorithm for finding partitions.

10. The computer program product of claim 9, wherein the heuristic algorithm comprises a Kernighan-Lin algorithm implemented to provide classifications.

11. The computer program product of claim 8, wherein the intent is determined by an intent classifier comprising machine learning and natural language processing to automatically group the keywords shared across the similar output data objects.

12. The computer program product of claim 8, wherein the template includes prepopulated features which are obtained from one or more previous output data objects of one or more users that have a similar intent.

13. The computer program product of claim 8, further comprising saving the template in a library which can be retrieved by one or more users.

14. A system comprising:
a processor, a computer readable memory, one or more computer readable storage media, and program instructions collectively stored on the one or more computer readable storage media, the program instructions executable to:
receive, from a plurality of disparate computing systems, a plurality of output data objects generated by one or more applications executed on the plurality of disparate computing systems, the plurality of output data objects including a plurality of fields;
provide, for display via an interface, a drop down menu containing the plurality of fields;
receive a first input from a user selecting a first field of the plurality of fields displayed via the interface;
extract text from a set of output data objects of the plurality of output data objects, the set of output data objects including the first field;
identify keywords in the text and the first field that are common to by similar output data objects of the set of output data objects, wherein the similar output data objects share one or more fields;
group the keywords that are shared across the similar output data objects of the set of output data objects into one or more clusters;
determine an intent of the user based on the keywords of the one or more clusters and the first field;
generate a suggested title based on the keywords of the one or more clusters;
generate a template based on the intent of the user, the template including the suggested title and the first field;
transmit, for display via the interface, the template; and
transmit, for display via the interface, in response to receiving a second input from the user selecting the template, a report generated using the template, the report including the suggested title and the first field.

15. The system of claim 14, wherein the template includes prepopulated features obtained from one or more previous output data objects generated by one or more users that have a similar intent.

* * * * *